United States Patent [19]
Ide et al.

[11] Patent Number: 5,771,718
[45] Date of Patent: Jun. 30, 1998

[54] CONCENTRATED WASHING MACHINE

[75] Inventors: Tetsuo Ide; Takefumi Ide, both of Fuji, Japan

[73] Assignee: Kabushiki Kaisha Taizen, Shizuoka, Japan

[21] Appl. No.: 614,046

[22] Filed: Mar. 12, 1996

[30] Foreign Application Priority Data

May 14, 1995 [JP] Japan .................................... 7-139999

[51] Int. Cl.$^6$ .................................................... D06B 5/04
[52] U.S. Cl. .............................. 68/142; 68/181 R; 8/156; 162/60; 209/273
[58] Field of Search .................................. 8/156; 162/60, 162/292, 299, 310, 315, 322, 357; 210/406, 497.3, 409; 68/181 R, 142, 148, 158, 152, 58; 209/273

[56] References Cited

U.S. PATENT DOCUMENTS

| | | |
|---|---|---|
| 1,862,208 | 6/1932 | Anhert . |
| 2,506,882 | 5/1950 | Lipscomb . |
| 3,081,873 | 3/1963 | Cowan et al. . |
| 3,511,374 | 5/1970 | Beal . |
| 4,238,324 | 12/1980 | Musslemann et al. .................. 209/273 |
| 4,267,035 | 5/1981 | Martin . |
| 4,485,646 | 12/1984 | Henricson ................................... 68/58 |
| 4,557,120 | 12/1985 | Sundham .................................... 58/58 |
| 5,259,955 | 11/1993 | Bolton . |
| 5,453,193 | 9/1995 | Maher et al. . |

*Primary Examiner*—Frankie L. Stinson
*Attorney, Agent, or Firm*—Armstrong, Westerman, Hattori, McLeland & Naughton

[57] ABSTRACT

The present invention provides a concentrated washing machine having a rotatable cylindrical drum made of punched metal. The drum has an inner surface lined with wire mesh and the drum is housed within a case body. A handle-shaped end plate, which is equipped with radial ribs, is provided at one end of the cylindrical drum. The other end of the cylindrical drum is open. The end plate has a wire mesh lining and is equipped with a suitable number of vanes. Extending into the open end of the cylindrical drum are: a wire mesh cleaning nozzle; a paper stock charge pipe for spraying onto the vanes; a pipe with numerous holes for spraying cleaning water onto the vanes, and a replenishment wetting water pipe. The handle-shaped end plate equipped with radial ribs and a wire mesh lining is provided at one end of the drum to increase the filter area and thereby improve the washing efficiency. The vanes agitate the paper stock by rotational movement to greatly improve the washing efficiency.

3 Claims, 2 Drawing Sheets

CONCENTRATED WASHING MACHINE

FIELD OF THE INVENTION

The present invention relates to a concentrated washing machine that is able to further de-ink paper stock that has already been treated by a de-inking machine for printed paper and various used paper for recycling.

BACKGROUND OF THE INVENTION

Washing machines, such as extractors, are known in the prior art. Referring to Japanese Unexamined Patent Application Publication No. 4-239601, a rotatable drum having a wire mesh covering the outside surface of the drum is arranged inside the main body. Paper stock is introduced into the main body and the drum is rotated so that the paper stock rubs against the mesh covering of the drum while being washed. A washing machine having a rotatable cylindrical drum made of punched metal and lined with wire mesh is also known. The rotatable cylindrical drum is arranged so as to be covered by a case body. The cylindrical drum is open at one end and has a suitable number of vanes at the other end. Extending into the open end of the cylindrical drum from the outside are: a wire mesh cleaning nozzle; a pipe having numerous holes for spraying cleaning water onto the vanes; and a replenishment wetting water pipe. The pipe having numerous holes for spraying water onto the vanes is located in proximity to the discharge outlet of a paper stock charge pipe.

A valve-less filter is also known in the prior art.

In the above-mentioned prior art technology a large amount of both water and bleaching chemical is required in order to increase the washing effect. It is also necessary to frequently clean the ink and carbon that has clogged the mesh covering the outside surface of the drum. This means the machine must be stopped frequently for cleaning.

In the prior art technology as described in Japanese Unexamined Patent Application Publication No. 4-239601, a concentrated washing machine includes a drum having a wire mesh lining inside the drum. The drum is open at one end and a blank circular plate having a suitable number of vanes is provided at the other end. The paper stock to be washed is sprayed at the vanes to strike the vanes, and the dirty water is discharged through the mesh of the body of the cylindrical drum. The washed paper stock then moves gradually to the open end of the drum and is discharged through the paper discharge outlet. The problem here is that it is difficult to discharge the dirty water containing the bleaching chemicals.

In consideration of the above problems, the present invention provides a concentrated washing machine having a simplified structure and high washing efficiency which requires less bleaching chemical. In place of the blank circular plate, a handle-shaped end plate with radial ribs and a wire mesh lining is provided. The paper stock is sprayed in and is washed by the vanes. The dirty water immediately passes through the mesh lining of the end plate and is discharged out the discharge outlet provided at the bottom of the cylindrical drum. By providing donut-shaped partitions, the flow of the washed paper stock is briefly halted so as to increase the time period in which to remove the water containing a lot of chemicals. The efficiency of the water discharge is increased until the paper stock blocked by the partitions gradually accumulates and eventually flows over. In this way, it is possible to continuously operate the washing machine without stopping for cleaning. Thus, the rotational power required is decreased to a minimum.

SUMMARY OF THE INVENTION

The present invention solves the above-mentioned problems by providing a concentrated washing machine including a rotatable cylindrical drum made of punched metal which is lined on the inside with wire mesh. The rotatable cylindrical drum is arranged so as to be covered by a case body. The cylindrical drum has a handle-shaped end plate and is equipped with radial ribs at one end thereof. The other end of the cylindrical drum is open. The handle-shaped end plate has a wire mesh lining and is equipped with a suitable number of vanes. A wire mesh cleaning nozzle extends into the open end of the cylindrical drum from the outside as does a pipe with numerous holes for spraying water onto the vanes to clean the vanes. The pipe with the numerous holes is arranged in proximity to a discharge outlet of a paper stock charge pipe for spraying the vanes. A replenishment wetting water pipe also extends into the open end of the cylindrical drum from the outside. The present invention also includes a paper stock charge pipe, a cleaning water charge pipe, a replenishment wetting water pipe inserted into the metal-mesh-lined cylindrical drum, and donut-shaped partitions of suitable height arranged at suitable intervals on the inside surface of the cylindrical drum.

The present invention further includes a vertical movement mechanism arranged so as to be able to move the open end of said cylindrical drum vertically using one end of the stand of the case body as a fulcrum.

Another embodiment of the present invention includes a cylindrical drum made of punched perforated metal and a handle-shaped end plate equipped with radial ribs and lined with a wire mesh. The surface area of the wire mesh on the end plate is increased and the washing effect is increased. A nozzle is arranged such that cleaning fluid can be sprayed close to the wire mesh. The paper stock is sprayed in such a manner that it strikes the vanes provided on the handle-shaped end plate. Since the handle-shaped end plate is equipped with radial ribs at one end of the cylindrical drum, the rotation of the cylindrical drum itself is supported. Thus, power consumption is reduced and the whole machine can be made smaller. Also, because it is possible to incline the case body, the degree of inclination can be increased and decreased to match the degree of dirtiness of the paper stock, thus improving the accuracy of the washing.

BRIEF DESCRIPTION OF THE DRAWING FIGURES

DETAILED DESCRIPTION OF THE INVENTION

Figure 1:
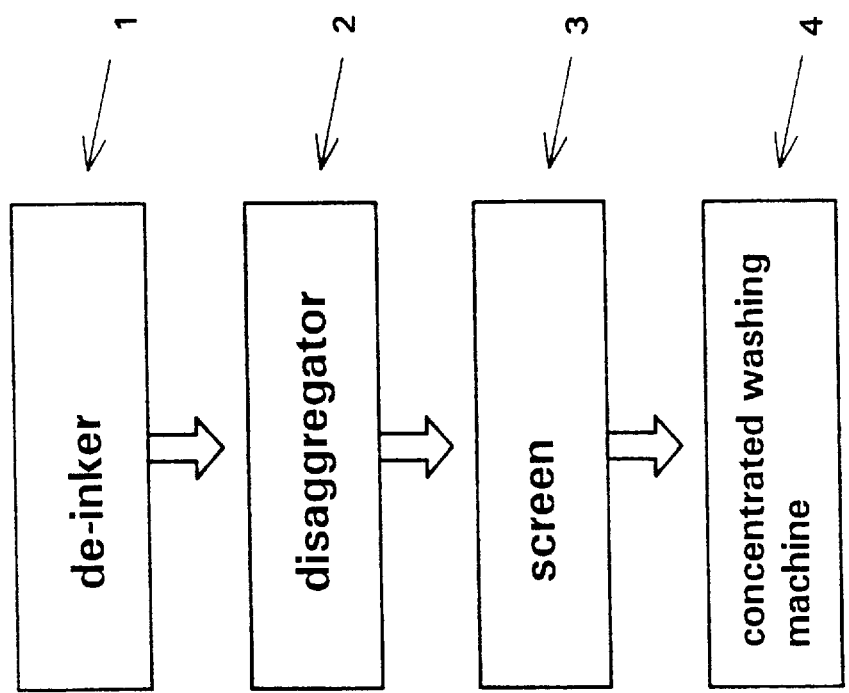
FIG. 1 is a simplified block diagram showing the operation of the concentrated washing machine according to the present invention.

The following is a detailed description of the preferred embodiments of the present invention with reference to the attached drawings. FIG. 1 is a simplified block diagram of one embodiment of the present invention. Concentrated paper stock, which is approximately 30% solid and 70% water, is discharged from a gradual pressure applying type prior art de-inker 1 and is charged into a prior art disaggregator 2. The concentrated washing machine in which the paper stock is held is then filled with clean water (industrial water) and the paper stock is decomposed and mixed. The decomposed and mixed paper stock is made to flow by a pressure pump to a known screen 3. Foreign material and miscellaneous material (particularly, things with a heavy specific gravity) are removed and the paper stock, which has been passed through the screen, is now approximately 1% solid and 99% water. This paper stock is now sprayed from the nozzle such that it strikes the vanes 12 of the handle-shaped end plate, which is at one end (drive side) of the punched metal 14 cylindrical drum 10 of the concentrated washing machine of the present invention, and which is equipped with radial ribs. The drum 10, which has a wire mesh 15 lining on the inside surface, is rotated by the driving device 11. Both clean water (industrial water) and wetting water (recycled water etc) are sprayed at the paper stock. Thus, paper stock that is 7% solid at the 93% water is obtained.

Figure 2:
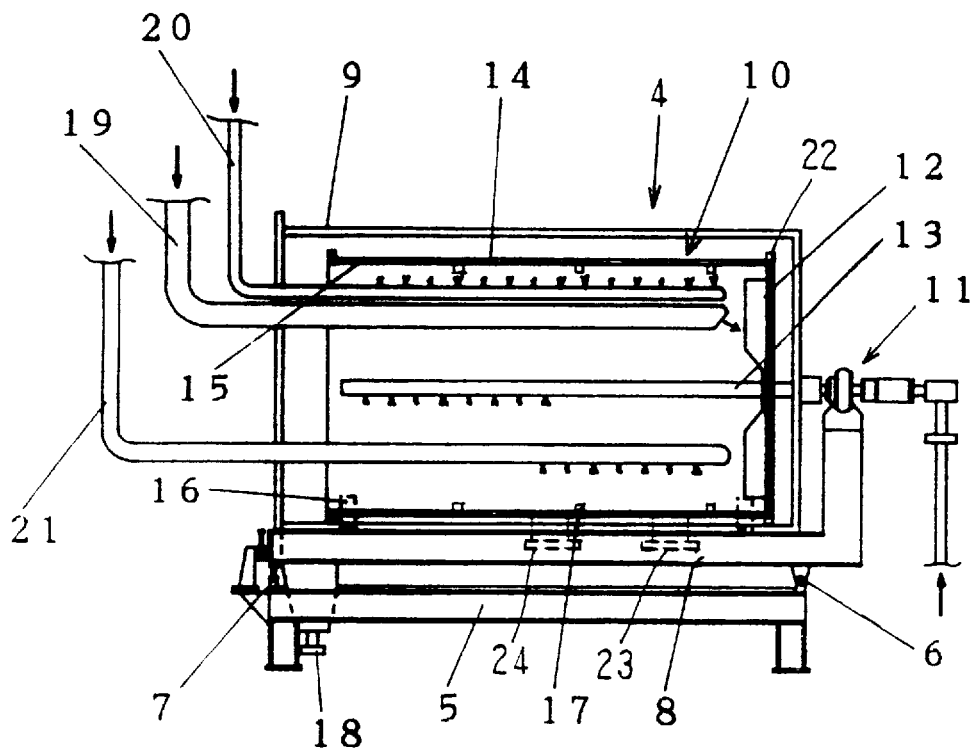
FIG. 2 is simplified plan view of the concentrated washing machine according to the present invention.
Figure 3:
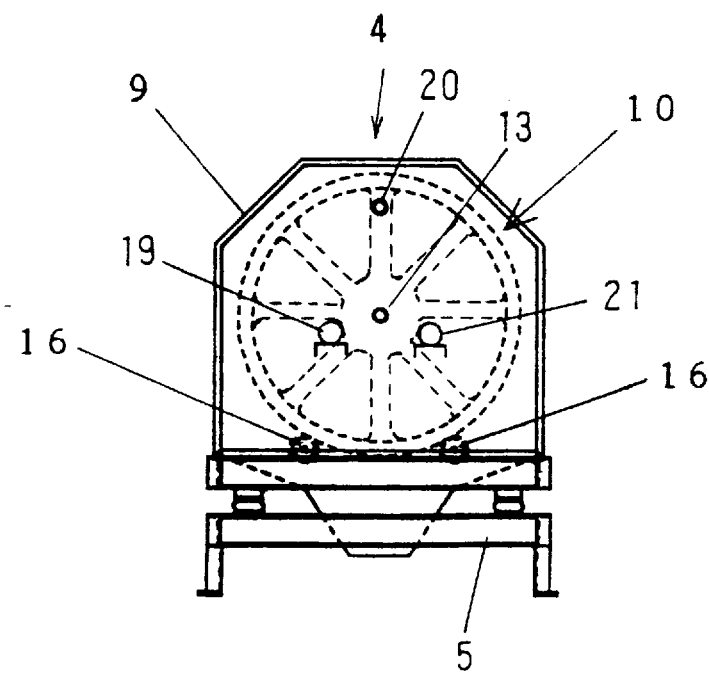
FIG. 3 is a simplified side view of the concentrated washing machine according to the present invention.

The following is a detailed description of another embodiment of the invention with reference to FIGS. 2 and 3. The concentrated washing machine, which is placed on a stand 5, is rotatably supported by a fulcrum 6 at one end of the stand 5. The other end (in this embodiment this refers to the paper stock discharge side) is supported by a vertical movement mechanism such as a pneumatic spring, piston cylinder or a jack, etc. indicated by numeral 7 on the base 8 such that the other end (or the paper stock discharge side) can be inclined. A driving device 11 (a small motor, etc.) is provided on one side of the fulcrum 6 side of the base 8 and is fitted into and fastened by way of a bearing to the wire-mesh-lined 15, punched metal cylindrical drum 10 of the concentrate washing machine. A rotary joint is provided such that clean water (industrial water) can be sprayed into the middle of the drum 10 while the drum 10 is being rotated by use of a pipe having many holes.

The previously mentioned cylindrical drum 10 is formed of punched metal in a cylindrical shape and has an inner surface lined with a wire mesh lining. A suitable number of vanes 12 (around ten vanes are preferred) are provided on the side of the driving device 11 on the handle-shaped end plate 22 which is equipped with a wire mesh 15 on the inside surface.

Rollers 16 are provided at suitable locations in the case body 9 at one end of the cylindrical drum 10 in order to ensure smooth rotation of the cylindrical drum 10. A suitable number of donut-shaped partitions 17 of a suitable height (approximately 100 mm) are provided at suitable intervals on the internal surface of the cylindrical drum 10 and a paper stock discharge outlet 18, is provided at one end. Dirty water containing ink, glue and wax, etc. is, of course, discharged from the waste liquid outlet 23. The paper stock supply pipe 19, which supplies paper stock from the screen 3, is equipped with a nozzle and this nozzle is arranged in a way that it sprays paper stock so as to strike the group of vanes 12 which are provided on the radial-rib equipped, wire-mesh-lined and handle-shaped end plate at one end of the cylindrical drum 10. Furthermore, a cleaning pipe 20 and a wetting water replenishment pipe 21 are provide through nozzle-shaped holes at suitable positions on the cylindrical drum 10. Reference numeral 24 refers to a return opening.

In this embodiment of a concentrated washing machine, the paper stock is poured into the rotating cylindrical drum from the raw material nozzle of the paper stock supply pipe 19. The material is rotated by the cylindrical drum 10 and mashed, and the water is removed. Consequently, the paper stock itself receives a sufficient agitation and washing so that the ink and chemicals, etc. between the fibers are easily washed out. Compared to the prior art machines in which cleaning is achieved simply by removing the water, the washing machine of the present invention has superlative washing efficiency. The water is filtered by the wire mesh 15 that lines the inside of the cylindrical drum 10 and is then discharged. The paper stock gradually moves to the paper stock discharge outlet 18 while it is being washed in the inclined cylindrical drum 10.

A mechanism for inclining the entire concentrated washing machine 4 is provided in order to regulate the degree of washing in response to the dirtiness of the paper stock that has been supplied. A more detailed description follows. A freely rotatable fulcrum 6 is provided at one end of the stand 5. At the other end of the stand, there is provided a vertical movement mechanism 7, such as a pneumatic spring, piston cylinder, jack, or a rack and pinion, etc., such that the degree of inclination of the open end of the cylindrical drum 10, opposite to the end of the cylindrical drum 10 with the group of vanes 12, can be regulated. During operation the most suitable degree of inclination is normally within a range of 2 to 5 degrees.

If this apparatus is provided with a rotatable cylindrical drum 10 that has an end plate 22 with a wire mesh 15 lining and if a group of vanes 12 are provided at one end of the cylindrical drum 10 such that the wire mesh 15 is cleaned and the paper stock is stirred while water is being supplied to separate the dirt from the paper stock, then it is possible for the cylindrical drum to be of a shape having many sides rather than just cylindrical. Also, when the paper stock contains many chemicals and it is difficult to remove the water, it is possible to improve the water discharge efficiency by providing donut-shaped partitions which briefly stop the flow of the paper stock and increase the length of time the paper stock is in the concentrated washing machine. During the time that the movement of the paper stock is halted by the partitions and until it accumulates to overflowing, the efficiency of the water discharge can be increased. Also, if only clean water is used for filling up the concentrated washing machine, the washing efficiency can be further increased. However, it goes without saying that recycled water can also be used.

The following effects can be obtained with the structure of the present invention as was described above.

(1) A handle-shaped end plate equipped with radial ribs and a wire mesh lining provided at one end of the drum, increases the filter area to improve the washing efficiency.

(2) The vanes agitate the paper stock by rotational movement to greatly improving the washing efficiency.

(3) Also, when the paper stock contains many chemicals and it is difficult to remove the water, it is possible to improve the water discharge efficiency by providing donut-shaped partitions which briefly stop the flow of the paper stock and increase the length of time the paper stock is in the concentrated washing machine. During the time that the movement of the paper stock is halted by the partitions and until it accumulates to overflowing, the efficiency of the water discharge is increased.

(4) There is little paper stock loss which improves the yield.

(5) The fineness of the mesh can be arbitrarily chosen.

(6) Virtually no maintenance is required and replacing the wire is simple.

(7) Little de-inking chemicals and water are required and moreover, with less water, the bleaching effect is increased.

(8) The paper stock strikes the vanes inside the drum, thereby assisting the rotation of the drum and making it possible to use a smaller motor.

(9) The angle of inclination of the drum can be adjusted so that the length of time the paper stock remains in the drum can be regulated. This makes it possible to regulate the washing in response to the degree of dirtiness.

(10) The installation is extremely compact.

(11) There are few breakdowns because the structure is simple.

What is claimed is:

1. A concentrated washing machine comprising:

a case body, a generally horizontally disposed rotatable cylindrical drum made of punched metal enclosed by said case body, said drum being open at one end and having a closure at its other end defined by a plurality of radially spaced ribs, a wire mesh lining the inner surface of said drum and said closure at said other end thereof, a plurality of vanes mounted on said drum closure, a plurality of fluid-conducting pipes extending from the exterior of said drum into the interior thereof, said pipes including:

a wire mesh cleaning nozzle operative to spray cleaning fluid onto said wire mesh lining the inner surface of said drum and the closure thereof, a paper stock charge pipe having openings operative to spray paper stock onto said vanes;

a pipe having a plurality of openings operative to spray cleaning water onto said vanes, said pipe being disposed in proximity to a discharge outlet of said paper stock charge pipe, and a replenishment wetting water pipe.

2. A concentrated washing machine according to claim 1 in which said paper stock charge pipe, said cleaning water charge pipe, and said replenishment wetting water pipe are all inserted into said open end of said metal-mesh-lined cylindrical drum, and donut-shaped partitions of suitable height are longitudinally spaced at suitable intervals along said inner surface of said cylindrical drum.

3. A concentrated washing machine according to either claim 2 or claim 1, including a paper stock discharge outlet disposed to receive paper stock discharged from said open end of said drum and a vertical movement mechanism operative to move said open end of said cylindrical drum vertically, said mechanism including means forming a fulcrum pivotally mounting said drum adjacent said other end thereof, and means operative to raise said one end of said drum adjacent said paper stock discharge outlet.

* * * * *